(12) United States Patent
Wang et al.

(10) Patent No.: US 12,206,892 B2
(45) Date of Patent: Jan. 21, 2025

(54) METHOD AND DEVICE FOR ENCODING OR DECODING BASED ON INTER-FRAME PREDICTION

(71) Applicant: PEKING UNIVERSITY SHENZHEN GRADUATE SCHOOL, Guangdong (CN)

(72) Inventors: Ronggang Wang, Guangdong (CN); Xi Xie, Guangdong (CN); Kui Fan, Guangdong (CN); Wen Gao, Guangdong (CN)

(73) Assignee: PEKING UNIVERSITY SHENZHEN GRADUATE SCHOOL, Guangdong (CN)

( * ) Notice: Subject to any disclaimer, the term of this patent is extended or adjusted under 35 U.S.C. 154(b) by 260 days.

(21) Appl. No.: 17/768,212

(22) PCT Filed: Oct. 25, 2019

(86) PCT No.: PCT/CN2019/113214
§ 371 (c)(1),
(2) Date: Apr. 11, 2022

(87) PCT Pub. No.: WO2021/072795
PCT Pub. Date: Apr. 22, 2021

(65) Prior Publication Data
US 2023/0109825 A1 Apr. 13, 2023

(30) Foreign Application Priority Data
Oct. 17, 2019 (CN) .......................... 201910989093.8

(51) Int. Cl.
*H04N 19/577* (2014.01)
*H04N 19/105* (2014.01)
(Continued)

(52) U.S. Cl.
CPC ......... *H04N 19/577* (2014.11); *H04N 19/105* (2014.11); *H04N 19/159* (2014.11); *H04N 19/176* (2014.11)

(58) Field of Classification Search
CPC .... H04N 19/176; H04N 19/52; H04N 19/105; H04N 19/61; H04N 19/70; H04N 19/139;
(Continued)

(56) References Cited

U.S. PATENT DOCUMENTS

2018/0070105 A1 3/2018 Jin et al.
2018/0213239 A1 7/2018 Mukherjee et al.
(Continued)

FOREIGN PATENT DOCUMENTS

CN 102340660 A 2/2012
CN 107071461 A 8/2017
(Continued)

OTHER PUBLICATIONS

International Search Report (with English translation) and Written Opinion issued in PCT/CN2019/113214; dated Jul. 16, 2020, 9 pages provided.

(Continued)

*Primary Examiner* — Farhan Mahmud
(74) *Attorney, Agent, or Firm* — HSML P. C.

(57) ABSTRACT

A method and a device for encoding or decoding based on an inter-frame prediction. The method includes steps of: determining a temporal motion vector prediction value of a to-be-processed coding unit, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit; determining a motion vector residual prediction value of the to-be-processed coding unit (Continued)

according to the temporal motion vector prediction value; determining a motion vector of a sub-block in the to-be-processed coding unit according to the temporal motion vector prediction value and the motion vector residual prediction value and performing a motion compensation according to the motion vector of the sub-block in the to-be-processed coding unit to determine a prediction block of the to-be-processed coding unit.

13 Claims, 6 Drawing Sheets

(51) Int. Cl.
 *H04N 19/159* (2014.01)
 *H04N 19/176* (2014.01)
(58) Field of Classification Search
 CPC ...... H04N 19/46; H04N 19/117; H04N 19/82; H04N 19/147; H04N 19/523; H04N 19/136
 See application file for complete search history.

(56) References Cited

U.S. PATENT DOCUMENTS

| | | |
|---|---|---|
| 2019/0141347 A1 | 5/2019 | Choi et al. |
| 2019/0387251 A1* | 12/2019 | Lin ...................... H04N 19/105 |

FOREIGN PATENT DOCUMENTS

| | | |
|---|---|---|
| CN | 107211156 A | 9/2017 |
| CN | 108347616 A | 7/2018 |
| CN | 109120940 A | 1/2019 |
| CN | 109510991 A | 3/2019 |
| CN | 109587479 A | 4/2019 |
| CN | 109891890 A | 6/2019 |
| WO | 2019194502 A1 | 10/2019 |
| WO | 2019187096 A1 | 4/2021 |

OTHER PUBLICATIONS

Fan et al., "Improved Intra Boundary Filters for HEVC", Publisher: IEEE, Dec. 2017, 4 pages.

* cited by examiner

METHOD AND DEVICE FOR ENCODING OR DECODING BASED ON INTER-FRAME PREDICTION

CROSS-REFERENCE TO RELATED APPLICATION

This application a National Stage Appl. filed under 35 USC 371 of International Patent Application No. PCT/CN2019/113214 with an international filing date of Oct. 25, 2019, designating the United States, now pending, which claims the priority of Chinese patent application CN2019109890938, filed on Oct. 17, 2019. The entire content of which is incorporated herein by reference.

TECHNICAL FIELD

This disclosure relates to the field of video coding technology, and in particular, to a method and a device for coding or decoding based on an inter-frame prediction.

BACKGROUND

Inter-frame prediction technology is an important technology in encoders, among which skip/direct mode plays an important role in improving performances of the encoder. The Skip/direct mode directly derives motion information of a current coding unit by means of the motion information of coded adjacent blocks in a spatial domain and the motion information of coded images in a temporal domain, instead of acquiring the motion information through a motion estimation. In the skip/direct mode, temporal motion vector prediction derives the motion information of the current coding unit by scaling the motion information of a co-located block, but for a case where the motion of video content is relatively strong, the content of the co-located block is often quite different from the current of the current coding unit, making the motion information of the referenced co-located block inaccurate, resulting in an inaccurate temporal motion vector prediction.

Therefore, a new method is desired which can improve the encoding and decoding performance of videos having relatively strong video content motion and improve the accuracy of motion vector prediction.

SUMMARY

Embodiments of this disclosure provide a method and a device for encoding and decoding based on an inter-frame prediction, aiming at solving a technical problem that the accuracy of the existing inter-frame prediction is poor when the motion of video content is relatively strong.

In order to solve the above-mentioned technical problem, the embodiments of this disclosure are implemented as follows:

In accordance with an embodiment of this disclosure, it is provided with a method for encoding based on an inter-frame prediction, the method includes steps of:

determining a temporal motion vector prediction value of a to-be-processed coding unit, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit;

determining, according to the temporal motion vector prediction value, a motion vector residual prediction value of the to-be-processed coding unit;

determining, according to the temporal motion vector prediction value and the motion vector residual prediction value, a motion vector of a sub-block in the to-be-processed coding unit; and performing, according to the motion vector of the sub-block in the to-be-processed coding unit, a motion compensation to determine a prediction block of the to-be-processed coding unit.

Further, the step of performing a motion compensation according to the motion vector of the sub-block in the to-be-processed coding unit to determine a prediction block of the to-be-processed coding unit also includes steps of:

determining, according to a rate-distortion optimization (RDO) decision, an encoding mode of the to-be-processed coding unit; and outputting a mark to a code stream where the to-be-processed coding unit is located, and the mark is configured to mark the encoding mode of the to-be-processed coding unit.

Further, the step of determining a motion vector residual prediction value of the to-be-processed coding unit according to the temporal motion vector prediction value specifically includes steps of:

determining a reference frame of the to-be-processed coding unit;

acquiring a motion vector of a sub-block adjacent to the to-be-processed coding unit, scaling the motion vector and the temporal motion vector prediction value, so that the motion vector and the temporal motion vector prediction value are scaled to the reference frame of the to-be-processed coding unit, to obtain a scaled motion vector of the sub-block adjacent to the to-be-processed coding unit and a scaled temporal motion vector prediction value of the sub-block adjacent to the to-be-processed coding unit;

acquiring, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit; and acquiring, according to the final motion vector residual prediction value of the sub-block adjacent to the to-be-processed coding unit or the sub-block in the to-be-processed coding unit, the motion vector residual prediction value of the to-be-processed coding unit.

Further, the step of acquiring, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit specifically includes steps of:

subtracting the scaled motion vector of the sub-block adjacent to the to-be-processed coding unit with the scaled temporal motion vector prediction value of the sub-block adjacent to the to-be-processed coding unit to obtain the motion vector residual prediction value of the sub-block adjacent to the to-be-processed coding unit;

acquiring, according to the motion vector residual prediction value of the sub-block adjacent to the to-be-processed coding unit, the final motion vector residual prediction value of the sub-block adjacent to the to-be-processed coding unit or the sub-block in the to-be-processed coding unit.

Further, the step of acquiring, according to the motion vector residual prediction value of the sub-block adjacent to the to-be-processed coding unit, the final motion vector residual prediction value of the sub-block adjacent to the to-be-processed coding unit or the sub-block in the to-be-processed coding unit specifically includes:

when the number of motion vector residual prediction values of the sub-block adjacent to the to-be-processed coding unit is greater than or equal to 3, a median value of the first three motion vector residual prediction values is used as the final motion vector residual prediction value of the sub-block adjacent to the to-be-processed coding unit;

when the number of motion vector residual prediction values of the sub-block adjacent to the to-be-processed coding unit is 0, the final motion vector residual prediction value of the sub-block adjacent to the to-be-processed coding unit is (0, 0);

otherwise, a mean value of the motion vector residual prediction values of the sub-block adjacent to the to-be-processed coding unit is used as the final motion vector residual prediction value of the sub-block adjacent to the to-be-processed coding unit.

Further, the step of acquiring, according to the motion vector residual prediction value of the sub-block adjacent to the to-be-processed coding unit, the final motion vector residual prediction value of the sub-block adjacent to the to-be-processed coding unit or the sub-block in the to-be-processed coding unit specifically includes steps of:

filling sub-blocks, temporal motion vector residual prediction values of which are unavailable, in the sub-blocks adjacent to the to-be-processed coding unit, according to the motion vector residual prediction value of the sub-block adjacent to the to-be-processed coding unit, to complete a filling of the temporal motion vector residual prediction values of the sub-blocks adjacent to the to-be-processed coding unit;

performing filling and filtering operations at left and/or upper and/or side and/or right outsides of the sub-block in the to-be-processed coding unit, according to the temporal motion vector prediction value of the sub-block in the to-be-processed coding unit in the temporal motion vector prediction value of the to-be-processed coding unit; and acquiring the final motion vector residual prediction value of the sub-block in the to-be-processed coding unit by a bi-linear interpolation.

Further, the step of performing filling operations at the left and/or upper and/or side and/or right outsides of the sub-blocks in the to-be-processed coding unit are as follows:

$$Mv[i][y]=Mv[0][y], -2<<i<0$$

$$Mv[x][k]=Mv[x][0], -2<<k<0$$

$$Mv[j][y]=Mv[M-1][y], M<<j<M+2$$

$$Mv[x][l]=Mv[x][N-1], N<<j<N+2$$

$$0<<x<M, 0<<y<N,$$

In which, $Mv[x][y]$ is the temporal motion vector prediction value of the sub-block in the to-be-processed coding unit before filtering; x and y denote column and row coordinates of the sub-block in a current coding unit in units of sub-blocks, respectively; x=0 indicates a first column of sub-blocks in the current coding unit, y=0 indicates a first row of sub-blocks in the current coding unit; i and j denote the column coordinates in units of sub-blocks, respectively; k and l denote the row coordinates in units of sub-blocks, respectively; M and N denote a width and a height of the current coding unit in units of sub-blocks, respectively.

Further, the filtering operations are as follows:

$$Mv_h=(3*Mv[x-2][y]+8*Mv[x-1][y]+10*Mv[x][y]+8*Mv[x+1][y]+3*Mv[x+2][y])/32$$

$$Mv_v=(3*Mv[x][y-2]+8*Mv[x][y-1]+10*Mv[x][y]+8*Mv[x][y+1]+3*Mv[x][y+2])/32$$

$$Mvf[x][y]=(Mv_h+Mv_v)/2$$

$$0<<x<M$$

$$0<<y<N$$

$Mv[X][y]$ is the temporal motion vector prediction of the sub-block in the to-be-processed coding unit before filtering; $Mvf[x][y]$ is the temporal motion vector prediction of the sub-block after filtering; $Mv_h$ and $Mv_v$ are temporary intermediate result from a vertical filtering and a horizontal filtering, respectively; x, y denote column and row coordinates of the sub-block in the current coding unit in units of sub-blocks, respectively; x=0 indicates a first column of sub-blocks in the current coding unit, y=0 indicates a first row of sub-blocks in the current coding unit; M and N denote a width and a height of the current coding unit in units of sub-blocks.

Further, the bi-linear interpolation is as follows:

$$Mvd_h=((M-x)*Mvdl[y]+x*Mvdt[M])/M$$

$$Mvd_v=((N-y)*Mvdt[x]+y*Mvdl[N])/N$$

$$Mvd[x][y]=(Mvd_h+Mvd_v)/2$$

$$0<<x<M$$

$$0<<y<N$$

Mvdl is the motion vector residual prediction of a left sub-block after filtering; Mvdt is the motion vector residual prediction of an upper sub-block after filtering; x, y denote column and row coordinates of the sub-block in a current coding unit in units of sub-blocks, respectively; x=0 indicates a first column of sub-blocks in the current coding unit, y=0 indicates a first row of sub-blocks in the current coding unit; M and N denote a width and a height of the current coding unit in units of sub-blocks; $Mvd[x][y]$ is the motion vector residual prediction of each sub-block in the current coding unit.

Further, the step of determining, according to the temporal motion vector prediction value and the motion vector residual prediction value, a motion vector of the sub-block in the to-be-processed coding unit specifically includes:

summing the temporal motion vector prediction value of the sub-block in the to-be-processed coding unit and the motion vector residual prediction value of the to-be-processed coding unit as the motion vector of the sub-block in the to-be-processed coding unit.

Further, the mark is a 1-bit mark.

In accordance with an embodiment of this disclosure, it is provided a device for encoding based on an inter-frame prediction, the device includes:

a temporal motion vector prediction module, which is configured to determine a temporal motion vector prediction value of the to-be-processed coding unit, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit;

a motion vector residual prediction module, which is configured to determine a motion vector residual prediction value of the to-be-processed coding unit according to the temporal motion vector prediction value;

a motion vector acquisition module, which is configured to determine a motion vector of a sub-block in the to-be-processed coding unit according to the temporal motion vector prediction value and the motion vector residual prediction value; and a prediction block acquisition module, which is configured to perform a motion compensation according to the motion vector of the sub-block in the to-be-processed coding unit to determine a prediction block of the to-be-processed coding unit.

In accordance with an embodiment of this disclosure, it is provided a method for decoding based on an inter-frame prediction, the method includes:

acquiring, according to a mark of a to-be-processed coding unit, an encoding mode of the to-be-processed coding unit, and the mark is configured to mark the encoding mode of the to-be-processed coding unit;

determining a temporal motion vector prediction value of the to-be-processed coding unit, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit;

determining, according to the temporal motion vector prediction value and the encoding mode of the to-be-processed coding unit, a motion vector residual prediction value of the to-be-processed coding unit;

determining, according to the temporal motion vector prediction value and the motion vector residual prediction value, a motion vector of a sub-block in the to-be-processed coding unit; and performing, according to the motion vector of the sub-block in the to-be-processed coding unit, a motion compensation to determine a prediction block of the to-be-processed coding unit.

In accordance with an embodiment of this disclosure, it is provided a device for decoding based on an inter-frame prediction, the device includes:

a decoding mark read module, which is configured to acquire an encoding mode of a to-be-processed coding unit according to a mark of the to-be-processed coding unit, where the mark is configured to mark the encoding mode of the to-be-processed coding unit;

a temporal motion vector prediction module, which is configured to determine a temporal motion vector prediction value of the to-be-processed coding unit, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit;

a motion vector residual prediction module, which is configured to determine a motion vector residual prediction value of the to-be-processed coding unit according to the temporal motion vector prediction value and the encoding mode of the to-be-processed coding unit;

a motion vector prediction module, which is configured to determine a motion vector of a sub-block in the to-be-processed coding unit according to the temporal motion vector prediction value and the motion vector residual prediction value; and a prediction block acquisition module, which is configured to perform a motion compensation according to the motion vector of the sub-block in the to-be-processed coding unit to determine a prediction block of the to-be-processed coding unit.

Beneficial effects that can be achieve by at least one of the above solutions in accordance with the embodiments of the present disclosure are as follows:

In the present application, a temporal motion vector prediction value of a coding unit to be processed is determined, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit. Based on the temporal motion vector prediction value, a temporal motion vector prediction value of the to-be-processed coding unit is determined. Based on the temporal motion vector prediction value and the motion vector residual prediction value, a motion vector of a sub-block in the to-be-processed coding unit is determined. Based on the motion vector of the sub-block in the to-be-processed coding unit, a motion compensation is performed to determine a prediction block of the to-be-processed coding unit. In the method provided by the present invention, the motion vector residual prediction is combined with subblock-based temporal motion vector prediction to derive a more accurate motion vector of a sub-block of the coding unit, which improves the accuracy of a prediction block, improves the coding efficiency without increasing coding complexity.

BRIEF DESCRIPTION OF THE DRAWINGS

In order to illustrate the technical solutions in embodiments of the present disclosure or the existing technologies more clearly, the following will briefly introduce the drawings required for description of the embodiments or the existing technologies. Obviously, the accompanying drawings in the following description are merely some embodiments described in this disclosure. For those of ordinary skill in the art, other drawings can also be obtained on basis of these drawings without paying creative labor.

DETAILED DESCRIPTION OF THE EMBODIMENTS

In order to make technical solutions in the present disclosure more comprehensible for those skilled in the art, the solutions in the embodiments of this disclosure will be clearly and completely described below with reference to the drawings in the embodiments of this disclosure. Obviously, the embodiments described are only some embodiments of the present application. All other embodiments obtained by persons of ordinary skill in the art based on the embodiments of this disclosure without creative efforts shall fall within the scope of protection of the present application.

Inter-frame coding exploits temporal redundancy of video. Usually in video information, objects contained in each frame have a motion relationship with the frames before and after, such motion relationship of the objects constitutes a direct temporal redundancy between frames. Since the motion correlation of objects between frames is greater than the correlation between adjacent pixels within one frame, especially for images with similar time, the temporal redundancy is more obvious than the spatial redundancy. Inter-frame prediction is based on block-based motion estimation and motion compensation to realize inter-frame coding. In the existing inter-frame prediction methods, the temporal motion vector prediction, in Skip/direct mode, derives motion information of a current coding unit by scaling motion information of a co-located block, but for a case where the motion of the video content is relatively strong, the content of the co-located block is often quite different from the content of the current coding unit, which makes the motion information of the referenced co-located block inaccurate, thus making the temporal motion vector prediction inaccurate. Therefore, a new inter-frame prediction method may be required, which can improve the accuracy of inter-frame prediction and the accuracy of encoding in the case of that the video has relatively strong video content motion.

Figure 1:
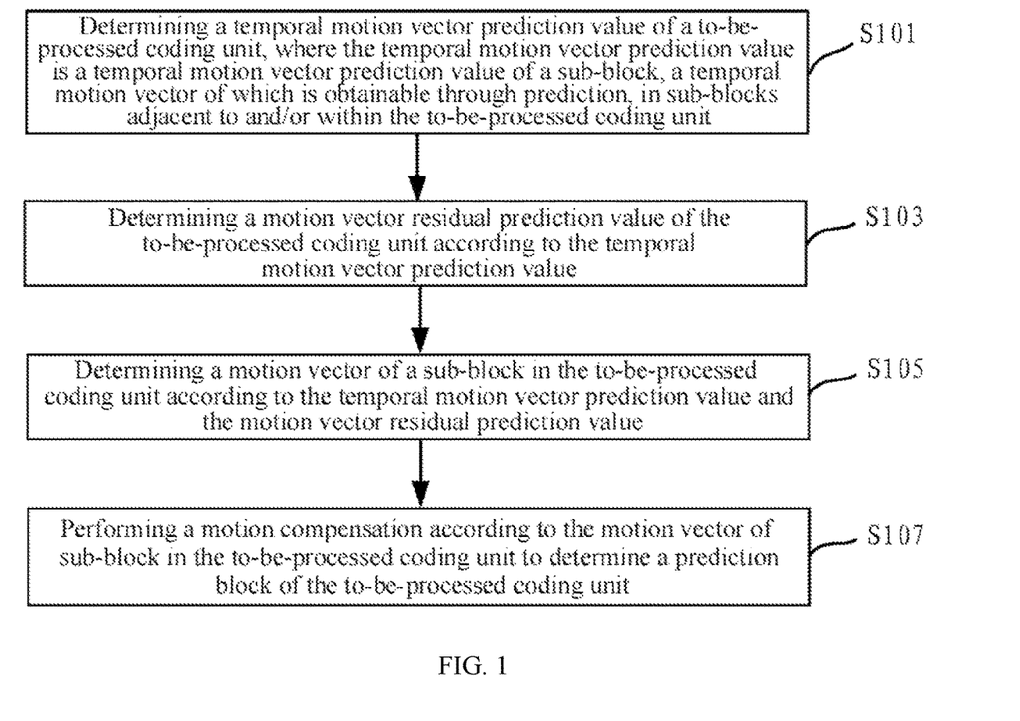
FIG. 1 is a block diagram of a method for encoding based on an inter-frame prediction in accordance with an embodiment of this disclosure.

FIG. 1 is a frame diagram of a method for encoding based on an inter-frame prediction in accordance with an embodiment of the present disclosure. Specifically, the method includes steps of S101, S103, S105 and S107.

Step S101: determining a temporal motion vector prediction value of a coding unit to be processed, where the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit.

In the present application, the alternative temporal motion vector prediction (ATMVP) is a sub-CU (coding unit) level motion vector prediction mechanism, being improved on basis of the temporal motion vector prediction (TMVP) and obtains multiple sets of motion information through blocks smaller than the current coding unit (sub-blocks of the coding unit).

In the present application, the temporal domain means that an image where the current block is located and an image where the corresponding block is located are at different time positions on a time axis of the video sequence, and these positions are represented by image sequence numbers. A temporal reference block, also called a co-located block (colBlock), refers to a block in the coded image in the temporal domain at the same coordinate position as the current coding unit.

In the present application, the applicable sub-blocks adjacent to the coding unit and/or sub-blocks in the coding unit are sub-blocks whose width and height are both greater than 4, including rectangular blocks with unequal width and height.

In the present application, the to-be-processed coding unit may be the current coding unit, that is, the unit that needs to be coded currently.

Step S103: determining a motion vector residual prediction value of the to-be-processed coding unit according to the temporal motion vector prediction value.

In an embodiment of the present application, the motion vector residual prediction value of the to-be-processed coding unit is acquired according to the motion vector prediction value of a sub-block adjacent to the to-be-processed coding unit.

Step S105: determining a motion vector of a sub-block in the to-be-processed coding unit according to the temporal motion vector prediction value and the motion vector residual prediction value.

In an embodiment of the present application, the motion vector of the sub-block in the to-be-processed coding unit is acquired according to the temporal motion vector prediction value and the motion vector residual prediction value.

Step S107: performing a motion compensation according to the motion vector of sub-block in the to-be-processed coding unit, to determine a prediction block of the to-be-processed coding unit.

At present, the inter-frame prediction part of the main video coding standards adopts the block-based motion compensation technology. The main principle is to find a best matching block in the previously encoded image for each pixel block of the current image, a process called motion estimation. The image used for prediction is referred to as a reference image, a displacement from the reference block to the current pixel block is referred to as a motion vector, and a difference between the current block and the reference block is referred to as a prediction residual. Due to the continuity of the video image sequence, the motion vector usually has a certain correlation in space and time. Similarly, the motion vector of the current block is predicted by using the adjacent motion vector in space or time, and only the prediction residual is coded, which can also greatly save the number of coding bits for motion vectors.

By using the method for encoding based on the inter-frame prediction in accordance with an embodiment of the present description, the accuracy of the inter-frame prediction can be improved, the coding accuracy can be improved, and thus the coding efficiency can be improved.

In an embodiment of this disclosure, the method for encoding based on an inter-frame prediction further includes the following steps of: determining an encoding mode of the to-be-processed coding unit according to a RDO decision; and outputting a mark to a code stream where the to-be-processed coding unit is located, and the mark is configured to mark the encoding mode of the to-be-processed coding unit.

Specifically, in the present application, a rate-distortion optimization (Rate-distortion optimization, RDO) strategy is adopted to compare a prediction block of the to-be-processed coding unit with a prediction block of the to-be-processed coding unit obtained by using other inter-frame prediction methods, and the prediction value having the least rate-distortion cost is used as the prediction block of the to-be-processed coding unit. It should be noted that other inter-frame prediction methods are different from the inter-frame prediction method of the present application.

After rate-distortion optimization, the prediction block of the to-be-processed coding unit is obtained, and at the same time, the code stream where the to-be-processed coding unit is located needs to be marked. It should be noted that the mark is configured to mark the encoding mode of the to-be-processed coding unit. In a specific implementation process, a 1-bit mark may be used.

Figure 2:
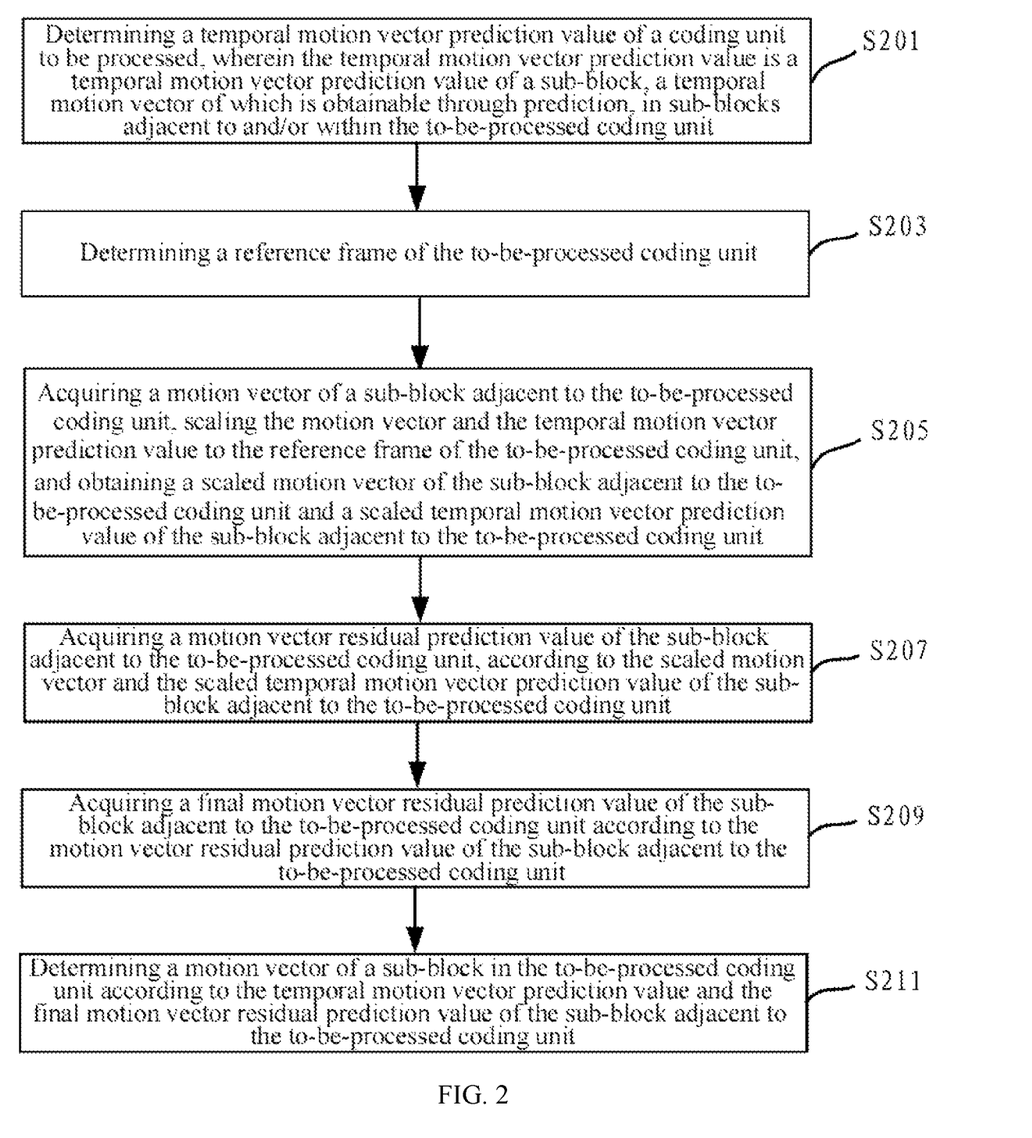
FIG. 2 is a flowchart of a method for encoding based on an inter-frame prediction in accordance with an embodiment of the present application.

In order to further understand the method for encoding based on an inter-frame prediction in accordance with the embodiment of the present application, FIG. 2 shows a flowchart of a method for encoding based on an inter-frame prediction in accordance with the embodiment of the present application, which specifically includes steps of S201, S203, S205, S207, S209 and S211.

Step S201: determining a temporal motion vector prediction value of a coding unit to be processed, wherein the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit.

Step S203: determining a reference frame of the to-be-processed coding unit.

In an embodiment of the present application, the reference frame used here is a fixed reference frame. In an embodiment of the present application, the first frame of the reference image list 0 and the first frame of the reference image list 1 are used as forward and backward reference frames of the to-be-processed coding unit, respectively. The reference image list 0 represents an index list corresponding to the forward reference frame, and the reference image list 1 represents an index list corresponding to the backward reference frame.

Step S205: acquiring a motion vector of a sub-block adjacent to the to-be-processed coding unit, scaling the motion vector and the temporal motion vector prediction value, so that the motion vector and the temporal motion vector prediction value is scaled to the reference frame of the to-be-processed coding unit, and obtaining a scaled motion vector of the sub-block adjacent to the to-be-processed coding unit and a scaled temporal motion vector prediction value of the sub-block adjacent to the to-be-processed coding unit.

Figure 3:
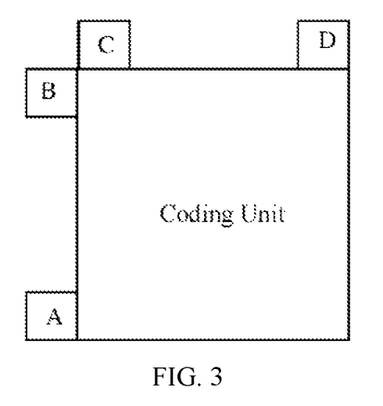
FIG. 3 is a schematic diagram of sub-blocks adjacent to a to-be-processed coding unit in accordance with an embodiment of the present application.

In an embodiment of the present application, the sub-blocks adjacent to the to-be-processed coding unit may be some or all of the sub-blocks located on left and upper sides of the to-be-processed coding unit, respectively. FIG. 3 shows a schematic diagram of sub-blocks adjacent to a to-be-processed coding unit according to an embodiment of the present application. In FIG. 3, two adjacent sub-blocks on the left and two adjacent sub-blocks on the upper side are respectively selected as the sub-blocks adjacent to the to-be-processed coding unit. Locations of the two adjacent sub-blocks on the left side and the two adjacent sub-blocks on the upper side can be selected randomly. In the embodiment shown in FIG. 3, the two adjacent sub-blocks on the left side are A and B, and the two adjacent sub-blocks on the upper side are C and D.

Step S207: acquiring a motion vector residual prediction value of the sub-block adjacent to the to-be-processed coding unit, according to the scaled motion vector of the sub-block adjacent to the to-be-processed coding unit and the scaled temporal motion vector prediction value of the sub-block adjacent to the to-be-processed coding unit.

In an embodiment of the present application, the motion vector residual prediction value of the sub-block adjacent to the to-be-processed coding unit in a reference direction is obtained by subtracting the scaled motion vector of the sub-block adjacent to the to-be-processed coding unit with the corresponding scaled temporal motion vector prediction value of the sub-block adjacent to the to-be-processed coding unit.

In an extension of the above embodiment, when the sub-blocks adjacent to the to-be-processed coding unit are A, B, C and D shown in FIG. 3, the method in accordance with the embodiment of the present application is configured to sequentially acquire motion vector residual prediction values of the adjacent sub-blocks A, B, C and D of the to-be-processed coding unit.

Step S209: acquiring a final motion vector residual prediction value of the sub-block adjacent to the to-be-processed coding unit according to the motion vector residual prediction value of the sub-block adjacent to the to-be-processed coding unit.

In an embodiment of the present application, when the number of motion vector residual prediction values of the sub-block adjacent to the to-be-processed coding unit is greater than or equal to 3, then a median value of the first three motion vector residual prediction values is used as the final motion vector residual prediction value of the sub-block adjacent to the to-be-processed coding unit.

When the number of motion vector residual prediction values of the sub-block adjacent to the to-be-processed coding unit is 0, the final motion vector residual prediction value of the sub-block adjacent to the to-be-processed coding unit is (0, 0).

Otherwise, a mean value of the motion vector residual prediction values of the sub-block adjacent to the to-be-processed coding unit is used as the final motion vector residual prediction value of the sub-block adjacent to the to-be-processed coding unit.

In an extension of the above embodiment, when the motion vector residual prediction values of the adjacent sub-blocks A, B, C and/or D of the to-be-processed coding unit can all be obtained, then a median value of the motion vector residual prediction values of the adjacent sub-blocks A, B, C of the to-be-processed coding unit is used as the final motion vector residual prediction value of the sub-block adjacent to the to-be-processed coding unit. When the motion vector residual prediction values of the adjacent sub-blocks A, B, C and D of the to-be-processed coding unit are not available, the final motion vector residual prediction value of the sub-block adjacent to the to-be-processed coding unit is (0, 0). When one or two of the motion vector residual prediction values of the adjacent sub-blocks A, B, C and D of the to-be-processed coding unit can be obtained through prediction, a mean value of the available motion vector residual prediction values in the sub-block adjacent to the to-be-processed coding unit is used as the final motion vector residual prediction value of the sub-block adjacent to the to-be-processed coding unit.

Step S211: determining a motion vector of a sub-block in the to-be-processed coding unit according to the temporal motion vector prediction value and the final motion vector residual prediction value of the sub-block adjacent to the to-be-processed coding unit.

In accordance with the method for encoding based on an inter-frame prediction provided by this embodiment, the final motion vector residual prediction of the sub-block adjacent to the to-be-processed coding unit is obtained based on the motion vector residual prediction values of several sub-block adjacent to the to-be-processed coding unit, such that an inter-frame coding is achieved, and the coding accuracy can be improved without increasing the coding complexity.

Figure 4:
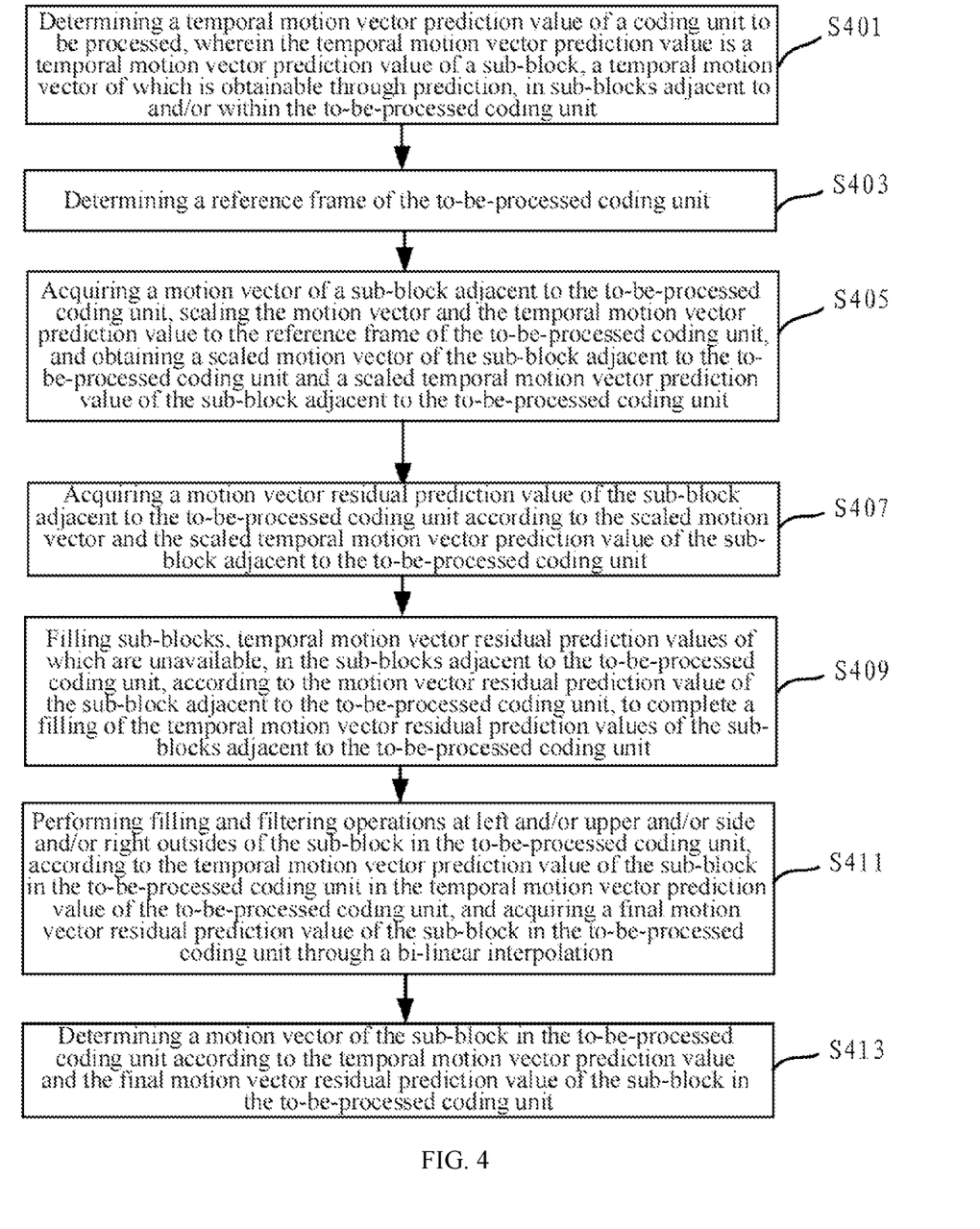
FIG. 4 is a flowchart of another method for encoding based on an inter-frame prediction in accordance with an embodiment of the present application.

In order to further understand the method for encoding based on an inter-frame prediction in accordance with the embodiment of the present application, FIG. 4 shows a flowchart of another method for encoding based on an inter-frame prediction in accordance with the embodiment of the present application, which specifically includes steps of S401, S403, S405, S407, S409 and S411.

Step S401: determining a temporal motion vector prediction value of a coding unit to be processed, wherein the temporal motion vector prediction value is a temporal motion vector prediction value of a sub-block, a temporal motion vector of which is obtainable through prediction, in sub-blocks adjacent to the to-be-processed coding unit and/or sub-blocks in the to-be-processed coding unit.

Step S403: determining a reference frame of the to-be-processed coding unit.

In this embodiment, the reference frame of the to-be-processed coding unit is determined in similar to the step of S203.

Step S405: acquiring a motion vector of a sub-block adjacent to the to-be-processed coding unit, scaling the motion vector and the temporal motion vector prediction value, so that the motion vector and the temporal motion vector prediction value are scaled to the reference frame of the to-be-processed coding unit, and obtaining a scaled motion vector of the sub-block adjacent to the to-be-processed coding unit and a scaled temporal motion vector prediction value of the sub-block adjacent to the to-be-processed coding unit.

In an embodiment of the present application, the sub-blocks adjacent to the to-be-processed coding unit are all sub-blocks located on left and upper sides of the to-be-processed coding unit, respectively.

Step S407: acquiring a motion vector residual prediction value of the sub-block adjacent to the to-be-processed coding unit according to the scaled motion vector of the sub-block adjacent to the to-be-processed coding unit and the scaled temporal motion vector prediction value of the sub-block adjacent to the to-be-processed coding unit.

In an embodiment of the present application, the motion vector residual prediction value of the sub-block adjacent to the to-be-processed coding unit after scaling is acquired though the step same as step S207.

Step S409: filling sub-blocks, temporal motion vector residual prediction values of which are unavailable, in the sub-blocks adjacent to the to-be-processed coding unit, according to the motion vector residual prediction value of the sub-block adjacent to the to-be-processed coding unit, to complete a filling of the temporal motion vector residual prediction values of the sub-blocks adjacent to the to-be-processed coding unit.

In an embodiment of the present application, the filling of the temporal motion vector residual prediction values of the sub-blocks adjacent to the to-be-processed coding unit includes a first-stage of filling and a second-stage of filling. The first stage of filling refers to finding a nearest sub-block, a temporal motion vector prediction value of which is available, in the row where the sub-blocks adjacent to the to-be-processed coding unit are located, and the first stage of filling is completed by using the temporal motion vector prediction value thereof as the temporal motion vector prediction value of this sub-block. The second-stage of filling refers to, on the basis of the first-stage of filling, for the other sub-blocks temporal motion vector prediction values of which are unavailable, in the sub-block adjacent to the to-be-processed coding unit, finding a sub-block, the temporal motion vector prediction value of which is available, in the column where the sub-block is located, and/or the sub-block which is filled in the first stage of filling, and the temporal motion vector prediction value thereof is used as the temporal motion vector prediction value of the sub-block.

Step S411: performing filling and filtering operations at left and/or upper and/or side and/or right outsides of the sub-block in the to-be-processed coding unit, according to the temporal motion vector prediction value of the sub-block in the to-be-processed coding unit in the temporal motion vector prediction value of the to-be-processed coding unit, and acquiring a final motion vector residual prediction value of the sub-block in the to-be-processed coding unit through a bi-linear interpolation.

In an embodiment of the present application, the step of performing filling operations at the left and/or upper and/or side and/or right outsides of the sub-block in the to-be-processed coding unit may specifically include:

$$Mv[i][y]=Mv[0][y], -2<<i<0$$

$$Mv[x][k]=Mv[x][0], -2<<k<0$$

$$Mv[j][y]=Mv[M-1][y], M<<j<M+2$$

$$Mv[x][l]=Mv[x][N-1], N<<j<N+2$$

$$0<<x<M, 0<<y<N,$$

In which, Mv[x] [y] is the temporal motion vector prediction value of the sub-block in the to-be-processed coding unit before filtering; x and y denote column and row coordinates of the sub-block in a current coding unit in units of sub-blocks, respectively; x=0 indicates a first column of sub-blocks in the current coding unit, y=0 indicates a first row of sub-blocks in the current coding unit; i and j denote the column coordinates in the unit of sub-blocks, respectively; k and l denote the row coordinates in the units of sub-blocks, respectively; M and N denote a width and a height of the current coding unit in the units of sub-blocks, respectively.

In an embodiment of the present application, the filtering operations are as follows:

$$Mv_h=(3*Mv[x-2][y]+8*Mv[x-1][y]+10*Mv[x][y]+8*Mv[x+1][y]+3*Mv[x+2][y])/32$$

$$Mv_v=(3*Mv[x][y-2]+8*Mv[x][y-1]+10*Mv[x][y]+8*Mv[x][y+1]+3*Mv[x][y+2])/32$$

$$Mvf[x][y]=(Mv_h+Mv_v)/2$$

$$0<<x<M$$

$$0<<y<N$$

Mv[x] [y] is the temporal motion vector prediction of the sub-block in the to-be-processed coding unit before filtering; Mvf[x] [y] is the temporal motion vector prediction of the sub-block after filtering; $Mv_h$ and $Mv_v$ are temporary intermediate result from a vertical filtering and a horizontal filtering, respectively; x, y denote the column and row coordinates of the sub-block in the current coding unit in units of sub-blocks, respectively; x=0 indicates the first column of sub-blocks in the current coding unit, y=0 indicates the first row of sub-blocks in the current coding unit;

M and N denote the width and height of the current coding unit in the units of sub-blocks.

Figure 5:
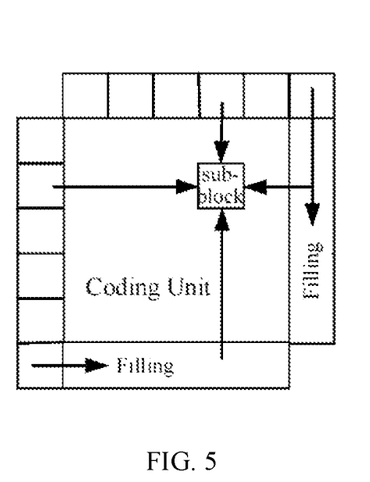
FIG. 5 is a schematic diagram of acquiring a motion vector residual prediction value using a bi-linear interpolation in accordance with an embodiment of the present application.

FIG. 5 is a schematic diagram of an acquisition of a motion vector residual prediction value through a bi-linear interpolation according to an embodiment of the present application. In this embodiment of the present application, the bi-linear interpolation is as follows:

$$Mvd_h = ((M-x)*Mvdl[y] + x*Mvdt[M])/M$$

$$Mvd_v = ((N-y)*Mvdt[x] + y*Mvdl[N])/N$$

$$Mvd[x][y] = (Mvd_h + Mvd_v)/2$$

$$0 << x < M$$

Mvdl is the motion vector residual prediction of a left sub-block after filtering; Mvdt is the motion vector residual prediction of an upper sub-block after filtering; x, y denote the column and row coordinates of the sub-block in the current coding unit in units of sub-blocks, respectively; x=0 indicates the first column of sub-blocks in the current coding unit, y=0 indicates the first row of sub-blocks in the current coding unit; M and N denote the width and height of the current coding unit in the units of sub-blocks; Mvd[x] [y] is the motion vector residual prediction of each sub-block in the current coding unit.

Step S413: determining a motion vector of the sub-block in the to-be-processed coding unit according to the temporal motion vector prediction value and the final motion vector residual prediction value of the sub-block in the to-be-processed coding unit.

In accordance with the method for encoding based on an inter-frame prediction provided by this embodiment, the motion vector residual prediction of the sub-block in the to-be-processed coding unit is obtained based on the motion vector residual prediction value of the sub-block adjacent to the to-be-processed coding unit, such that an inter-frame coding is achieved, and the coding accuracy can be improved without increasing the coding complexity.

Figure 6:
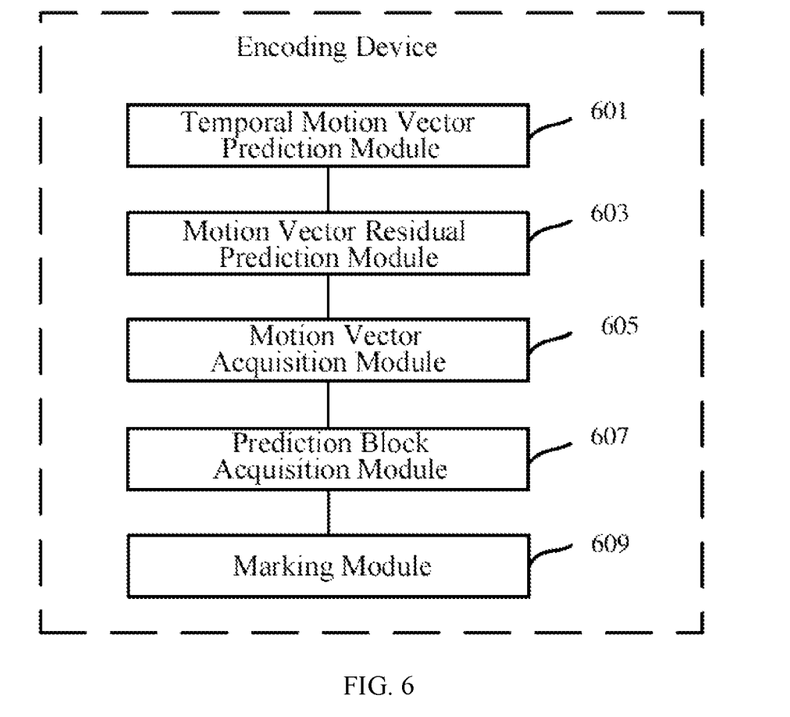
FIG. 6 is a schematic diagram of a device for encoding based on an inter-frame prediction in accordance with an embodiment of the present application.

The method for encoding based on an inter-frame prediction is described in detail above, and correspondingly, this disclosure also provides a device for encoding based on an inter-frame prediction, as shown in FIG. 6. FIG. 6 is a schematic diagram of a device for encoding based on an inter-frame prediction in accordance with an embodiment of the present application. The encoding device includes a temporal motion vector prediction module 601, a motion vector residual prediction module 603, a motion vector acquisition module 605 and a prediction block acquisition module 607.

The temporal motion vector prediction module 601 is configured to determine a temporal motion vector prediction value of a coding unit to be processed. The temporal motion vector prediction value is a temporal motion vector prediction value of a sub-block, of which a temporal motion vector is obtainable through prediction, in sub-blocks adjacent to the to-be-processed coding unit and/or sub-blocks in the to-be-processed coding unit.

The motion vector residual prediction module 603 is configured to determine a motion vector residual prediction value of the to-be-processed coding unit according to the temporal motion vector prediction value.

The motion vector acquisition module 605 is configured to determine a motion vector of a sub-block in the to-be-processed coding unit according to the temporal motion vector prediction value and the motion vector residual prediction value.

The prediction block acquisition module 607 is configured to perform a motion compensation according to the motion vector of the sub-block in the to-be-processed coding unit to determine a prediction block of the to-be-processed coding unit.

Further, the encoding device also includes a marking module 609, which is configured to perform operations that includes: determining a encoding mode of the to-be-processed coding unit based on a RDO decision; and outputting a mark to a code stream where the to-be-processed coding unit is located. The mark is configured to mark the encoding mode of the to-be-processed coding unit.

In accordance with this disclosure, it is also provided a method for decoding based on an inter-frame prediction, the decoding method includes step of:

acquiring an encoding mode of a to-be-processed coding unit based on a mark of the to-be-processed coding unit, and the mark is configured to mark the encoding mode of the to-be-processed coding unit;

determining a temporal motion vector prediction value of the to-be-processed coding unit, where the temporal motion vector prediction value is a temporal motion vector prediction value of a sub-block, of which a temporal motion vector is obtainable through prediction, in sub-blocks adjacent to the to-be-processed coding unit and/or sub-blocks in the to-be-processed coding unit;

determining, according to the temporal motion vector prediction value and the encoding mode of the to-be-processed coding unit, a motion vector residual prediction value of the to-be-processed coding unit;

determining, according to the temporal motion vector prediction value and the motion vector residual prediction value, a motion vector of a sub-block in the to-be-processed coding unit; and performing a motion compensation according to the motion vector of the sub-block in the to-be-processed coding unit to determine a prediction block of the to-be-processed coding unit.

Figure 7:
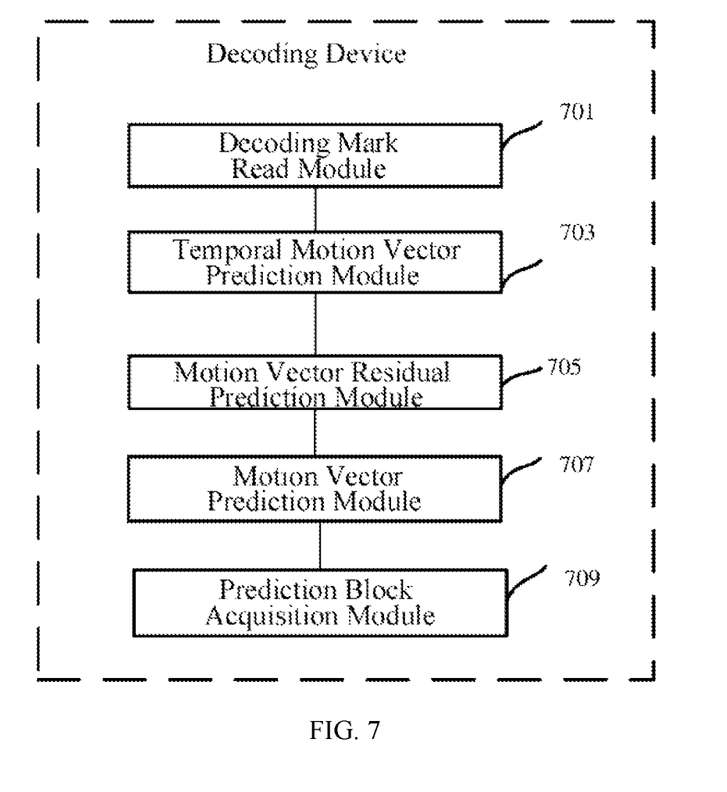
FIG. 7 is a schematic diagram of a device for decoding based on an inter-frame prediction in accordance with an embodiment of the present application.

The method for decoding based on an inter-frame prediction is described in detail above, and correspondingly, this disclosure also provides a device for decoding based on an inter-frame prediction, as shown in FIG. 7. FIG. 7 is a schematic diagram of a device or decoding based on an inter-frame prediction in accordance with an embodiment of the present application. The decoding device includes a decoding mark read module 701, a temporal motion vector prediction module 703, a motion vector residual prediction module 705, a motion vector prediction module 707 and a prediction block acquisition module 709.

The decoding mark read module 701 is configured to acquire an encoding mode of a to-be-processed coding unit based on a mark of the to-be-processed coding unit, wherein the mark is configured to mark the encoding mode of the to-be-processed coding unit;

The temporal motion vector prediction module 703 is configured to determine a temporal motion vector prediction value of the to-be-processed coding unit. The temporal motion vector prediction value is a temporal motion vector prediction value of a sub-block, of which a temporal motion vector is obtainable through prediction, in sub-blocks adjacent to the to-be-processed coding unit and/or sub-blocks in the to-be-processed coding unit.

The motion vector residual prediction module 705 is configured to determine a motion vector residual prediction value of the to-be-processed coding unit according to the temporal motion vector prediction value and the encoding mode of the to-be-processed coding unit.

The motion vector prediction module 707 is configured to determine a motion vector of a sub-block in the to-be-processed coding unit according to the temporal motion vector prediction value and the motion vector residual prediction value.

The prediction block acquisition module 709 is configured to perform a motion compensation according to the motion vector of the sub-block in the to-be-processed coding unit to determine a prediction block of the to-be-processed coding unit.

The foregoing has described specific embodiments of the present disclosure, and other embodiments may be included by the scope of the appended claims. In some cases, operations or steps recited in the claims can be performed in an order different from that in the above-mentioned embodiments and still can achieve desirable results. Additionally, the processes depicted in the figures do not necessarily require the particular order or sequential order shown, to achieve desirable results. In some embodiments, multitasking and parallel processing are also possible or may be advantageous.

Each embodiment in this disclosure is described in a progressive manner, and the same and similar parts between various embodiments may be referred to each other, and highlights of each embodiment focus on the differences from other embodiments. In particular, for apparatuses, electronic devices, or non-volatile computer storage medium embodiments, since they are basically similar to the method embodiments, the description is relatively simple, and reference may be made to some descriptions of the method embodiments for related parts.

The apparatuses, electronic devices, and non-volatile computer storage medium provided in the embodiments of this disclosure correspond to the methods. Therefore, the apparatuses, electronic devices, and non-volatile computer storage medium also have beneficial effects similar to those of the corresponding methods. The beneficial effects of the method have been described in detail above, and therefore, the beneficial effects of the corresponding apparatus, electronic equipment, and non-volatile computer storage medium will not be repeated here.

In the 1990s, an improvement in technology could be clearly differentiated between improvements in hardware (for example, improvements in circuit structures such as diodes, transistors, switches, etc.) or improvements in software (improvements in method processes). However, with the development of technology, many improvements in method processes today can be regarded as a direct improvement of the hardware circuit structure. Designers almost always get the corresponding hardware circuit structure by programming an improved method process into the hardware circuit. Therefore, it should not be considered that the improvement of a method flow cannot be implemented by hardware entity modules. For example, a Programmable Logic Device (PLD), such as a Field Programmable Gate Array (FPGA), is an integrated circuit whose logic function is determined by a user programming the device. It is programmed by the designer to "integrate" a digital system on a piece of PLD without having to ask the chip manufacturer to design and manufacture a dedicated integrated circuit chip. Moreover, today, instead of manufacturing integrated circuit chips, this kind of programming is also mostly implemented using "logic compiler" software, which is similar to the software compiler used when writing programs, but before compiling the raw code must also be written in a specific programming language, which is called a hardware descriptor language (HDL), and the HDL is not the only one, there are lots of hardware descriptor language, such as advanced boolean wxpression language (ABEL), altera hardware description language (AHDL), confluence, cornell university programming language (CUPL), HDCal, java hardware description language (JHDL), Lava, Lola, MyHDL, PALASM, ruby hardware description language (RHDL), etc.. the very-high-speed integrated circuit hardware description language (VHDL) and Verilog are the most commonly used at present. It should also be clear to those skilled in the art that a hardware circuit for implementing the logic method process can be easily obtained by simply programming the method process into an integrated circuit using the above-mentioned several hardware description languages.

The controller may be implemented in any suitable manner, for example, the controller may be e.g., a microprocessor or a processor and a computer readable medium storing computer readable program code (e.g., software or firmware) executable by the (micro)processor, logic gates, switches, application specific integrated circuits (ASICs), programmable logic controllers and embedded microcontrollers. Examples of controllers include but are not limited to the following microcontrollers: ARC 625D, Atmel AT91SAM, Microchip PIC18F26K20 and Silicon Labs C8051F320, the memory controller can also be implemented as part of the control logic of the memory. Those skilled in the art also know that, in addition to the controllers implemented in the form of pure computer-readable program code, the controller can be implemented in the form of logic gates, switches, application-specific integrated circuits, programmable logic controllers and embedded microcontroller, etc. to achieve the same function by logically programming the method steps. Therefore, such a controller can be regarded as a hardware component, and the devices included therein for realizing various functions can also be regarded as a structure within the hardware component. Or even, the devices for implementing various functions can be regarded as both a software module implementing a method and a structure within a hardware component.

The systems, devices, modules or units described in the above embodiments may be specifically implemented by computer chips or entities, or by products with certain functions. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

For convenience of description, when describing the above device, the functions are divided into various units and described respectively. Of course, when implementing one or more embodiments of this disclosure, the functions of each unit may be implemented in one or more software and/or hardware.

It should be appreciated for those skilled in the art, the embodiments of this disclosure may be provided as a method, a system, or a computer program product. Accordingly, embodiments of this disclosure may be an entire hardware embodiment, an entire software embodiment, or an embodiment combining software and hardware aspects. Furthermore, embodiments of this disclosure may be reflected in form of a computer program product implemented on one or more computer-usable storage media (including but not limited to disk storage, CD-ROM, optical storage, etc.) having computer-usable program code embodied therein.

This disclosure is described with reference to flowchart illustrations and/or block diagrams of methods, apparatus (systems), and computer program products according to embodiments of the present disclosure. It should be understood that each flow and/or block in the flowcharts and/or block diagrams, and combinations of flows and/or blocks in the flowcharts and/or block diagrams, can be implemented by computer program instructions. These computer program instructions may be provided to the processor of a general-purpose computer, special purpose computer, embedded processor or other programmable data optimization device to produce a machine such that the instructions executed by the processor of the computer or other programmable data optimization device produce devices for implementing the functions specified in a flow or multiply flows of a flowchart and/or a block or multiply blocks of a block diagram.

The computer program instructions may also be stored in a computer readable memory capable of directing a computer or other programmable data optimization devices to function in a particular manner, such that the instructions stored in the computer readable memory result in an article of manufacture comprising instruction devices, the instruction devices implement the functions specified in a flow or multiply flows of a flowchart and/or a block or multiply blocks of a block diagram.

These computer program instructions may also be loaded on a computer or other programmable data optimization devices to cause a series of operational steps to be performed on the computer or other programmable devices to produce a computer-implemented process such that the instructions provide steps for implementing the functions specified in a flow or multiply flows of a flowchart and/or a block or multiply blocks of a block diagram.

In a typical configuration, a computing device includes one or more processors (CPU), input/output interfaces, network interfaces, and a memory.

Memory may include forms of non-permanent memory in computer readable media, random access memory (RAM) and/or non-volatile memory, such as read only memory (ROM) or flash memory (flash RAM). Memory is an example of a computer-readable medium.

Computer-readable media includes both permanent and non-permanent, removable and non-removable media, and storage of information may be implemented by any method or technology. Information may be computer readable instructions, data structures, modules of programs, or other data. Examples of computer storage media include, but are not limited to, phase-change memory (PRAM), static random-access memory (SRAM), dynamic random-access memory (DRAM), other types of random-access memory (RAM), read only memory (ROM), electrically erasable programmable read only memory (EEPROM), flash memory or other memory technology, compact disc read only memory (CD-ROM). digital versatile disc (DVD) or other optical storage, magnetic tape cassettes, magnetic tape magnetic disk storage or other magnetic storage devices or any other non-transmission medium that can be used to store information that can be accessed by a computing device. As defined herein, computer-readable media does not include transitory computer-readable media, such as modulated data signals and carrier waves.

It should also be noted that the terms "including," "comprising" or any other variation thereof are intended to encompass a non-exclusive inclusion such that a process, method, article or device including a series of elements includes not only those elements, but also other elements not expressly listed, or which are inherent to such a process, method, article or apparatus are also included. Without further limitation, an element defined by the phrase "comprising a . . . " does not preclude the presence of additional identical elements in a process, method, article of manufacture or device that includes this element.

The present disclosure may be described in the general context of computer-executable instructions, such as program modules, being executed by a computer. Generally, program modules include routines, programs, objects, components, data structures, etc. that perform particular tasks or implement particular abstract data types. This disclosure can also be practiced in distributed computing environments where tasks are performed by remote processing devices that are linked through a communication network. In a distributed computing environment, the program modules may be located in both local and remote computer storage media including storage devices.

Each embodiment in this disclosure is described in a progressive manner, and the same and similar parts between various embodiments may be referred to each other, and highlights of each embodiment focus on the differences from other embodiments. In particular, as the system embodiments are basically similar to the method embodiments, the description for system embodiments is relatively simple, and reference may be made to some descriptions of the method embodiments for related parts.

The above descriptions are merely some embodiments of the present disclosure, and are not intended to limit the present application. For those skilled in the art, various modifications and variations of the present application are possible. Any modification, equivalent replacement, improvement, etc. made within the spirit and principle of the present application shall be included within the protection scope of the claims of the present application.

What is claimed is:

1. A method for encoding based on an inter-frame prediction, comprising:
   determining a temporal motion vector prediction value of a to-be-processed coding unit,
   wherein the temporal motion vector prediction value is at least one of a temporal motion vector prediction value of a sub-block, a temporal motion vector of which is obtainable through prediction, in sub-blocks adjacent to the to-be-processed coding unit or sub-blocks in the to-be-processed coding unit;
   determining, according to the temporal motion vector prediction value, a motion vector residual prediction value of the to-be-processed coding unit;
   determining, according to the temporal motion vector prediction value and the motion vector residual prediction value, a motion vector of a sub-block in the to-be-processed coding unit; and
   performing a motion compensation according to the motion vector of the sub-block in the to-be-processed coding unit to determine a prediction block of the to-be-processed coding unit,
   wherein the determining of the motion vector residual prediction value of the to-be-processed coding unit comprises:
      determining a reference frame of the to-be-processed coding unit;
      acquiring a motion vector of a sub-block adjacent to the to-be-processed coding unit, scaling the motion vector and the temporal motion vector prediction value, so that the motion vector and the temporal motion vector prediction value are scaled to the reference frame of the to-be-processed coding unit, and obtaining a scaled motion vector of the sub-block adjacent to the to-be-processed coding unit and a scaled temporal motion vector prediction value of the sub-block adjacent to the to-be-processed coding unit;

acquiring, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit; and acquiring, according to the final motion vector residual prediction value of the sub-block adjacent to the to-be-processed coding unit or the sub-block in the to-be-processed coding unit, the motion vector residual prediction value of the to-be-processed coding unit.

2. The method according to claim 1, wherein the performing of the motion compensation according to the motion vector of sub-block in the to-be-processed coding unit to determine the prediction block of the to-be-processed coding unit comprises:

determining an encoding mode of the to-be-processed coding unit according to a rate-distortion optimization decision; and outputting a mark to a code stream where the to-be-processed coding unit is located,
wherein the mark is configured to mark the encoding mode of the to-be-processed coding unit.

3. The method according to claim 2, wherein the mark is a 1-bit mark.

4. The method according to claim 1, wherein the acquiring of the final motion vector residual prediction value of the sub-block adjacent to the to-be-processed coding unit or the sub-block in the to-be-processed coding unit further comprises:

subtracting the scaled motion vector of the sub-block adjacent to the to-be-processed coding unit with the scaled temporal motion vector prediction value of the sub-block adjacent to the to-be-processed coding unit to obtain a motion vector residual prediction value of the sub-block adjacent to the to-be-processed coding unit;

acquiring, according to the motion vector residual prediction value of the sub-block adjacent to the to-be-processed coding unit, the final motion vector residual prediction value of the sub-block adjacent to the to-be-processed coding unit or the sub-block in the to-be-processed coding unit.

5. The method according to claim 4, wherein the acquiring of the final motion vector residual prediction value of the sub-block adjacent to the to-be-processed coding unit further comprises:

when a number of motion vector residual prediction values of the sub-block adjacent to the to-be-processed coding unit is greater than or equal to 3, a median value of the first three motion vector residual prediction values is used as the final motion vector residual prediction value of the sub-block adjacent to the to-be-processed coding unit, when a number of motion vector residual prediction values of the sub-block adjacent to the to-be-processed coding unit is 0, then the final motion vector residual prediction value of the sub-block adjacent to the to-be-processed coding unit is (0, 0), and a mean value of the motion vector residual prediction values of the sub-block adjacent to the to-be-processed coding unit is used as the final motion vector residual prediction value of the sub-block adjacent to the to-be-processed coding unit.

6. The method according to claim 4, wherein the acquiring of the final motion vector residual prediction value of the sub-block in the to-be-processed coding unit comprises:

filling, according to the motion vector residual prediction value of the sub-block adjacent to the to-be-processed coding unit, sub-blocks, temporal motion vector residual prediction values which are unavailable, in the sub-blocks adjacent to the to-be-processed coding unit, to complete a filling of the temporal motion vector residual prediction values of sub-blocks adjacent to the to-be-processed coding unit;

performing filling and filtering operations at at least one of left, upper, lower, or right outsides of the sub-block in the to-be-processed coding unit, according to the temporal motion vector prediction value of sub-block in the to-be-processed coding unit in the temporal motion vector prediction value of the to-be-processed coding unit; and acquiring the final motion vector residual prediction value of the sub-block in the to-be-processed coding unit through a bi-linear interpolation.

7. The method according to claim 6, wherein the filling operations at at least one of the left, upper, lower, or right outsides of the sub-block in the to-be-processed coding unit are:

$$Mv[t][y]=Mv[0][y], -2<<t<0$$

$$Mv[x][k]=Mv[x][0], -2<<k<0$$

$$Mv[f][y]=Mv[M-1][y], M<<j<M+2$$

$$Mv[v][l]=Mv[x][N-1], N<<j<N+2$$

$$0<<x<M, 0<<y<N,$$

wherein Mv [x] [y] is the temporal motion vector prediction value of the sub-block in the to-be-processed coding unit before filtering, x and y denote column and row coordinates of the sub-block in a current coding unit in units of sub-blocks, respectively, x=0 indicates a first column of sub-blocks in the current coding unit, y=0 indicates a first row of sub-blocks in the current coding unit, i and j denote the column coordinates in units of sub-blocks, respectively, k and l denote the row coordinates in units of sub-blocks, respectively, and M and N denote a width and a height of the current coding unit in units of sub-blocks, respectively.

8. The method according to claim 6, wherein the filtering operations are:

$$Mv_h=(3*Mv[x-2][y]+8*Mv[x-1][y]+10*Mv[x][y]+8*Mv[x+1][y]+3*Mv[x+2][y])/32$$

$$Mv_v+(3*Mv[x][y-2]+8*Mv[x][y-1]+10*Mv[x][y]+8*Mv[x][y+1]+3*Mv[x][y+2])/32$$

$$Mvf[x][y]=(Mv_h+Mv_v)/2$$

$0 << x < M$ $0 << y < N$

Mv [x] [y] is the temporal motion vector prediction of the sub-block in the to-be-processed coding unit before filtering, Mvf [x] [y] is the temporal motion vector prediction of the sub-block after filtering, $MV_h$ and $Mv_v$ are temporary intermediate result from a vertical filtering and a horizontal filtering, respectively, x, y denote column and row coordinates of the sub-block in a current coding unit in units of sub-blocks, respectively, x=0 indicates a first column of sub-blocks in the current coding unit, y=0 indicates a first row of sub-blocks in the current coding unit, and M and N denote a width and a height of the current coding unit in units of sub-blocks.

9. The method according to claim 6, wherein the bi-linear interpolation is:

$$Mvd_h=((M-x)*Mvdl[y]=x*Mvdt[M])/M$$

$$Mvd_v=((N-y)*Mvdt[x]=y*Mvdl[N])/N$$

$$Mvd[x][y]=(Mvd_h+Mvd_v)/2$$

$0 << x < M$ $0 << y < N$

Mvdl is the motion vector residual prediction of a left sub-block after filtering; Mvdt is the motion vector residual prediction of an upper sub-block after filtering; x, y denote column and row coordinates of the sub-block in a current coding unit in units of sub-blocks, respectively;

x=0 indicates a first column of sub-blocks in the current coding unit, y=0 indicates a first row of sub-blocks in the current coding unit; M and N denote a width and a height of the current coding unit in units of sub-blocks; Mvd[x] [y] is the motion vector residual prediction of each sub-block in the current coding unit.

10. The method according to claim 1, wherein the determining of the motion vector of the sub-block in the to-be-processed coding unit comprises:

summing the temporal motion vector prediction value of the sub-block in the to-be-processed coding unit and the motion vector residual prediction value of the to-be-processed coding unit as the motion vector of the sub-block in the to-be-processed coding unit.

11. A device for encoding based on an inter-frame prediction, comprising:

a temporal motion vector prediction module configured to determine a temporal motion vector prediction value of a to-be-processed coding unit, wherein the temporal motion vector prediction value is at least one of a temporal motion vector prediction value of a sub-block, a temporal motion vector of which is obtainable through prediction, in sub-blocks adjacent to the to-be-processed coding unit or sub-blocks in the to-be-processed coding unit;

a motion vector residual prediction module, configured to determine a motion vector residual prediction value of the to-be-processed coding unit according to the temporal motion vector prediction value;

a motion vector acquisition module, configured to determine a motion vector of a sub-block in the to-be-processed coding unit according to the temporal motion vector prediction value and the motion vector residual prediction value;

a prediction block acquisition module, configured to perform a motion compensation according to the motion vector of the sub-block in the to-be-processed coding unit to determine a prediction block of the to-be-processed coding unit, wherein the motion vector residual prediction module is further configured to:

determine a reference frame of the to-be-processed coding unit, acquire a motion vector of a sub-block adjacent to the to-be-processed coding unit, scale the motion vector and the temporal motion vector prediction value, so that the motion vector and the temporal motion vector prediction value are scaled to the reference frame of the to-be-processed coding unit, and obtain a scaled motion vector of the sub-block adjacent to the to-be-processed coding unit and a scaled temporal motion vector prediction value of the sub-block adjacent to the to-be-processed coding unit;

acquire, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit; and acquire, according to the final motion vector residual prediction value of the sub-block adjacent to the to-be-processed coding unit or the sub-block in the to-be-processed coding unit, the motion vector residual prediction value of the to-be-processed coding unit.

12. A method for decoding based on an inter-frame prediction, comprising:

acquiring, according to a mark of a to-be-processed coding unit, an encoding mode of the to-be-processed coding unit, wherein the mark is configured to mark the encoding mode of the to-be-processed coding unit;

determining a temporal motion vector prediction value of the to-be-processed coding unit, wherein the temporal motion vector prediction value is at least one of a temporal motion vector prediction value of a sub-block, a temporal motion vector of which is obtainable through prediction, in sub-blocks adjacent to the to-be-processed coding unit or sub-blocks in the to-be-processed coding unit;

determining, according to the temporal motion vector prediction value and the encoding mode of the to-be-processed coding unit, a motion vector residual prediction value of the to-be-processed coding unit;

determining, according to the temporal motion vector prediction value and the motion vector residual prediction value, a motion vector of a sub-block in the to-be-processed coding unit;

performing a motion compensation according to the motion vector of the sub-block in the to-be-processed coding unit to determine a prediction block of the to-be-processed coding unit, wherein the determining the temporal motion vector prediction value of the to-be-processed coding unit further comprises:
   determining a reference frame of the to-be-processed coding unit;
   acquiring a motion vector of a sub-block adjacent to the to-be-processed coding unit, scaling the motion vector and the temporal motion vector prediction value, so that the motion vector and the temporal motion vector prediction value are scaled to the reference frame of the to-be-processed coding unit, and obtaining a scaled motion vector of the sub-block adjacent to the to-be-processed coding unit and a scaled temporal motion vector prediction value of the sub-block adjacent to the to-be-processed coding unit;
   acquiring, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit; and
   acquiring, according to the final motion vector residual prediction value of the sub-block adjacent to the to-be-processed coding unit or the sub-block in the to-be-processed coding unit, the motion vector residual prediction value of the to-be-processed coding unit.

13. A device for decoding based on an inter-frame prediction, comprising:
   a decoding mark read module, configured to acquire an encoding mode of a to-be-processed coding unit according to a mark of the to-be-processed coding unit, wherein the mark is configured to mark the encoding mode of the to-be-processed coding unit;
   a temporal motion vector prediction module, configured to determine a temporal motion vector prediction value of the to-be-processed coding unit,
      wherein the temporal motion vector prediction value is at least one of a temporal motion vector prediction value of a sub-block, a temporal motion vector of which is obtainable through prediction, in sub-blocks adjacent to the to-be-processed coding unit or sub-blocks in the to-be-processed coding unit;
   a motion vector residual prediction module configured to determine a motion vector residual prediction value of the to-be-processed coding unit according to the temporal motion vector prediction value and the encoding mode of the to-be-processed coding unit;
   a motion vector prediction module configured to determine a motion vector of a sub-block in the to-be-processed coding unit according to the temporal motion vector prediction value and the motion vector residual prediction value;
   a prediction block acquisition module configured to perform a motion compensation according to the motion vector of the sub-block in the to-be-processed coding unit to determine a prediction block of the to-be-processed coding unit,
      wherein the motion vector residual prediction module is further configured to:
         determine a reference frame of the to-be-processed coding unit;
         acquire a motion vector of a sub-block adjacent to the to-be-processed coding unit, scale the motion vector and the temporal motion vector prediction value, so that the motion vector and the temporal motion vector prediction value are scaled to the reference frame of the to-be-processed coding unit, and obtain a scaled motion vector of the sub-block adjacent to the to-be-processed coding unit and a scaled temporal motion vector prediction value of the sub-block adjacent to the to-be-processed coding unit;
         acquire, according to the scaled motion vector of the sub-block adjacent to the to-be-processed coding unit and the scaled temporal motion vector prediction value of the sub-block adjacent to the to-be-processed coding unit, a final motion vector residual prediction value of the sub-block adjacent to the to-be-processed coding unit or the sub-block in the to-be-processed coding unit; and
         acquire, according to the final motion vector residual prediction value of the sub-block adjacent to the to-be-processed coding unit or the sub-block in the to-be-processed coding unit, the motion vector residual prediction value of the to-be-processed coding unit.

* * * * *